3,676,104
PRE-TREATMENT OF METAL-BEARING MINERAL PRODUCTS
Per G. Kihlstedt, Stockholm, Sweden, assignor to AB Cold-Bound Pellets, Djurshol, Sweden
Filed Mar. 21, 1969, Ser. No. 809,289
Claims priority, application Sweden, Mar. 25, 1968, 3,918/68; Apr. 11, 1968, 4,947/68
Int. Cl. C21b 1/24
U.S. Cl. 75—3           7 Claims

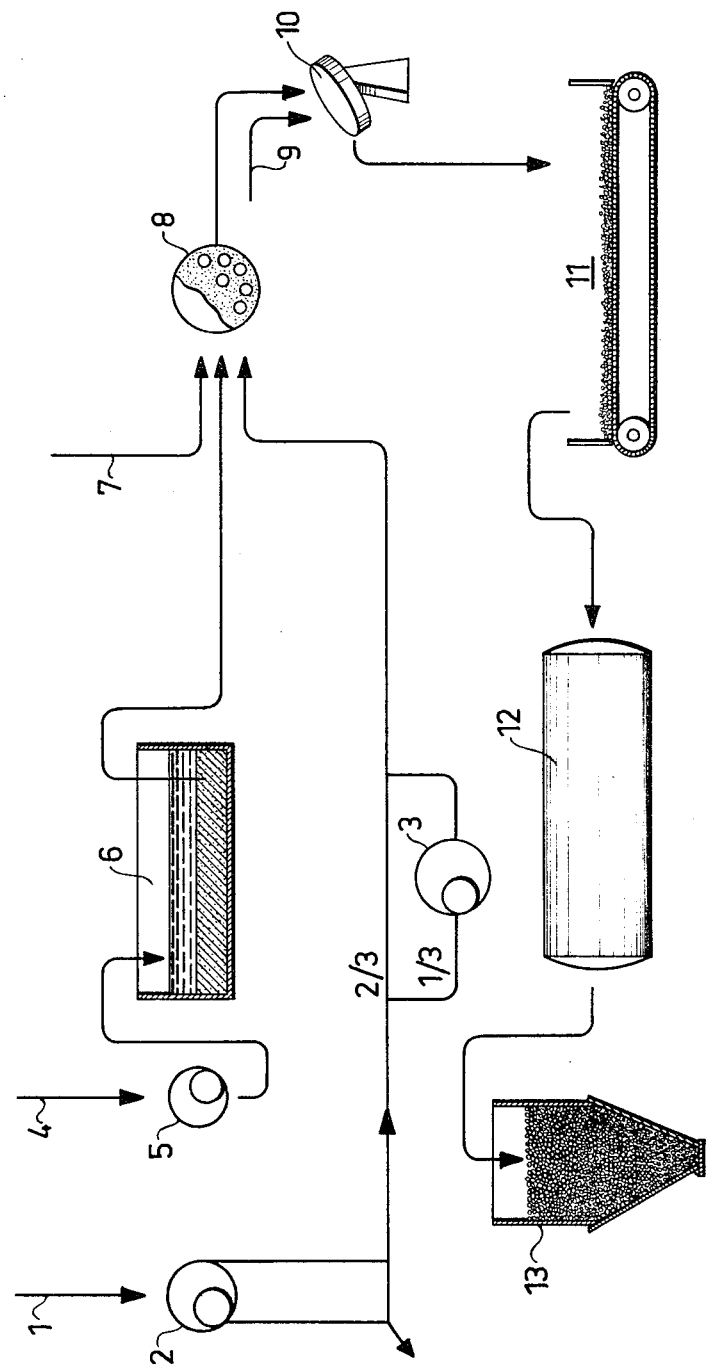

ABSTRACT OF THE DISCLOSURE

Pellets of metal-bearing mineral concentrates are produced by mixing together concentrates differing in ranges of grain sizes, together with a binder, grinding the mixture to a pre-determined extent, forming the ground mixture into pellets and autoclaving the pellets. Normally, the concentrates are moist, in which event the pellets are partially dried before being subjected to autoclaving.

---

The present invention relates to the pre-treatment of metal-bearing (metal-containing) mineral products, preferably iron ore concentrates, and is concerned with the production of cold-bonded pellets or similar agglomerates of ore concentrates bound together by lime and/or an hydraulic binder.

The agglomeration process, which may occur in various forms, now is considered to constitute a normally necessary operation in the dressing of iron ore materials. The agglomeration process can be said to define a restoring complement to the fine grinding of the ores, which fine grinding is an operation that is necessary for the concentration of the minerals, and the importance of the agglomeration process will be still greater the more one has to bring about a far-reaching refining or low grade or poor, minerals.

Among the conventional agglomeration methods there can be mentioned down-draft sintering, and sintering of pellets. At the present the technique of iron-ore agglomeration is dominated by the former process, but the number of pelletizing plants is rapidly increasing. These plants are of the kind where moisture-bound "green" pellets are indurated to sintered pellets at about 1250° C. Such conventional agglomeration methods have been developed for concentrates produced by mechancially wet dressing or magnetically wet dressing techniques, which procedures have been common since the beginning of this century. They are based, at least during the initial stage, upon the utilization of the capillary forces of water for building up an agglomerate during the step prior to the baking. The water-bindings upon which these conventional agglomeration methods are based are, however, adversely influenced when surface chemical methods are employed for completing the mineral refinement. It is evident that it is necessary to improve the agglomeration methods and to widen the principal base for their bindings in order to enable the necessary development of the flotation refinement process.

The technique which, in this connection, is considered to be the most promising for development may be given the common name "cold-binding," as it is not based upon the principle of sintering but rather upon the usage of cementing or crystallizing binders which are active at room temperature or at moderately raised temperatures. One of the suggested "cold-binding" methods is based on the use of slaked lime as a binder. According to one embodiment, slaked lime and water are supplied to the ground iron-ore concentrate: after these materials have been thoroughly mixed the mixture is rolled into pellets and stream-hardened in a pressure autoclave at about 200° C. Such an autoclaving method is described e.g. in U.S. Pat. No. 3,235,371, according to which there is added calcium hydroxide and alkali as an accelerator. The examples illustrated, however, only concern the production of briquettes, though in the preamble to the specification it is said that also pellets may be produced according to the corresponding principles. Experiments which have been carried out during the development of the present invention, however, have not shown such advantages of the admixture of alkali that it can be said to compensate for the fact that the presence of alkali influences the blast furnace process in a disadvantageous manner therein that it causes disturbances in the material flow through the furnace and may adversely affect the furnace linings.

In order to obtain a resistant agglomerate it has also been suggested to use hydraulic binders, such for instance as portland cement. When using hydraulic binders, the hardening is achieved by the precipitation of gel- and crystal-substances after reactions between $CaO$, $SiO_2$, and $H_2O$ with greater or lesser contributions from $Al_2O_3$. The use of cement as a binder yields an agglomerate which can satisfy high demands as to strength.

Standard cement is not suitable for this purpose, because there is added to it hydrated calcium sulphate (gypsum), which results in that the calcium silicate, which is introduced in the process with the cement, in the form of slag is characterized by a remarkably diminished ability of absorbing sulphur in the blast furnace. Moreover, the cement contains silicic acid, wherefore the admixture brings about a drastic increase in the volume of slag necessary for maintaining the optimal slag basicity. A cement containing no gypsum gives somewhat more beneficial slag conditions. In certain situations it is, however, extremely difficult (by reasons which have to do with costs and composition of the admixture) to add cement and/or calcium hydrate binders in such quantities that are necessary for the ore concentrate, if said concentrate is to be processed in the form of cold-bound pellets. Especially is this the fact when steel furnace slags are returned in order to keep the percentage of phosphorus within tolerated limits and/or to take care of all valuable ingredients of the steel furnace slag, such as iron, manganese, etc.

During the development of the present invention it has been discovered that it is possible to add the steel furnace slag itself as a binder, alone or together with cement or calcium hydrate, etc. It is known that finely ground blast furnace slag acts as an hydraulic binder, and blast furnace slag admixed with cement or slaked lime is, to a great extent, made use of as a binder for different kinds of building materials. Blast furnace slag had also been suggested as a binder for the cold-binding of iron ore concentrates, but due to the drawbacks attendant upon the returning of the blast furnace slag to the blast furnace process, the method has not received any acceptance in modern iron production.

When using steel furnace slag as a binder, the slag should first be slaked in water in the same way as slaked lime. Hereby its binding ability developable during the autoclave process is most remarkably improved so that it will be comparable with the binding ability of cement. If desired, it is of course also possible to admix lime, cement or other binding agents as complements to the slaked steel furnace slag, as well as for instance accelerators; i.e. agents which accelerate the chemical reactions constituting the hardening of the agglomerate. Due to the fact that steel furnace slag can be made use of as a binder there is gained an opportunity in a practical manner to return those valuable ingredients (different metals) which are present in the slag yielded in the refining and decarburization of smelted steel.

Experiments, however, have shown that in order to achieve strength features of slag-bound pellets comparable with the strength features of cement-bound pellets, the homogenization of the ore concentrate and the binder is question of greatest importance. This to a still higher degree is the case when using only, or substantially only, lime as a binder. Thus, common mixing devices such as screw mixers have not been able satisfactorily to homogenize the agglomerate. By a certain degree of joint grinding of ore concentrate and binder, however, the strength features are essentially improved, and the invention is, therefore, in its major aspect characterized by such joint grinding. The experiments have been carried out in a small scale by means of a rod mill, and the invention is also characterized by the use of such rod mill as homogenizing device. The strength of the pellets produced when using a rod mill as homogenizer is much greater than what can be explained only by reason of a better distribution of binding agent and in improved close-packing. In certain cases the increase in strength has been several hundred percent, and hence there is reason to suspect that a surprising chemical reaction and/or surface action has taken place between the binding agents and the iron concentrate surfaces during the grinding operation.

High demands also must be placed upon the degree of close-packing of the agglomerate particles in order to obtain high strengths. When using concentrate all of which has been ground to the normal, very fine, particle size distributions of at least 80% finer than 0.08 mm., it has proved to be impossible to obtain pellets satisfying the demands which must be raised with regard to necessary strength during transportation and charging to the blast furnace. If, however, the agglomerate according to a further development of the invention intentionally is composed of ore concentrates ground to different particle size distributions there is an opportunity of obtaining a higher degree of close-packing and thereby a satisfactorily high strength of the finished pellets treated in the autoclave. Preferably, the ore is ground to discontinuous particle size distributions, in which the different components have selected and completely different particle size distributions. It has proved to be particularly advantageous if about two-thirds of the ore is ground to a rather coarse fraction of up to about 80% minus 0.4 mm., while only the remaining one-third is ground to a finer fraction having the grain sizes of about 80% minus 0.08 mm., which are the sizes that are most usual in connection with the pelletizing of ore concentrates. By this selective grinding there are created conditions for stronger pellets at the same time as there is gained the essential saving of costs and work residing in that only a rather small fraction has to be ground to the smallest particle dimensions.

Another principle of obtaining a close packing is to choose continuous particle size distributions. If the cumulative weight percent as a function of the particle size distribution is illustrated in a diagram, the size distributions should be such that the diagram curve will receive the same inclination as a curve illustrating the discontinuous distribution.

Further features and advantages of the invention will be apparent from the following description, in which, with reference to the accompanying scheme, there will be described a process for the agglomeration of iron-ore concentrates.

The raw material 1 consists of iron ore which is ground in a suitable mill 2 to particle sizes optimal for the concentration process. After the concentration process the iron ore concentrate is divided into two parts. One part—which should be about ⅓ of the entire quantity—is fine ground 3 to a particle size distribution of at least 80% finer than 0.08 mm. By this selective grinding there are obtained conditions for an effective pellet-forming without the entire concentrate quantity having to be further ground; besides (as has been mentioned in the preamble), there is also obtained a higher strength in the finished agglomerate owing to an improved close-packing by reason of the favorable size distribution of particles. Of course it is also possible to choose two ready-ground fractions, one fraction having coarse and one fraction having fine grain sizes.

According to the present experiments there was utilized as binder a steel furnace slag 4 from Kaldo-furnaces. The invention, however, is not limited to slag derived from the Kaldo-process, because slags from other steel processes in which a smelt is treated with oxygen as well as from the basic open hearth process thus may be used. The only demand is that the steel-producing process brings about a basic slag which contains the necessary binding components at the same time as it is substantially free from detrimental components which one does not wish to return to the iron-steel production process.

The steel furnace slag is ground in a mill 5 to a fineness approximately corresponding to the fineness of standard cement. Hereupon the slag is slaked in water 6 in the same manner as when slaking lime. By this action the slag quite surprisingly acquires a binding ability comparable with that of cement.

Moist ore concentrate, slaked steel furnace slag and possibly a certain quantity of cement and/or slaked lime and/or an accelerator 7 are thoroughly mixed and jointly ground to a certain degree in a rod mill 8 which proves to give a superior homogenizing effect with a distribution of the binding agent over all ore particles and presumably a certain so-called "mechano-chemical increase of reaction tendency." During one experiment the mixture in the rod mill 8 had the following composition:

| | Weight percent |
|---|---|
| Concentrate (iron ore+gangue) | 84.4 |
| Slaked steel furnace slag | 10.4 |
| Cement (portland) | 5.2 |

The conjoint grinding was carried out to a degree corresponding to a gross energy supply to the mill of about 35 wh./ton lump.

A certain degree of moisture is necessary for the ensuing pellet rolling operation, wherefore water 9 is supplied in order to realize a perfect pellet formation. The pellet rolling operation is carried out by means of an ordinary pelletizing disc 10 but might as well be carried out by means of any other pellet-rolling apparatus such, for instance, as a cylinder or a cone.

It should be emphasized that the homogenized mixture should be transmitted to the pelletizing disc directly from the rod mill. During some experiments the mixture was stored in a container for a short time before it was formed to pellets. It was proved that the strength of the finished agglomerate thereby became essentially impaired.

The pellets formed by means of the pelletizing disc are brought to a conveyor running at a low speed. The conveyor is arranged to define a drying plant 11 with raised temperature and air blowing. After autoclaving in an autoclave 12 during 10 hours at a temperature of about 200° C. and a pressure of about 20 atmospheres there are obtained pellets which satisfy all demands as to strength as well as to porosity. The strength in a cold state is more than 200 kp. for a pellet with a diameter of 15 mm. The pore number (pore volume/solid volume) is about 0.25. If, however, the pre-drying moment is omitted the pellets are disintegrated in the autoclave, a condition which must be explained on the basis of the high moisture content in the pellets. It therefore seems to be necessary to diminish the free moisture content to about 5%, which simply can be carried out by suitable control of the residence time of the pellets on the drying bed. The pre-drying of course can be speeded up by means of ventilators and/or by moderate heating. Further, it is important that the steel furnace slag is slaked when the pellets are being formed. If the slaking operation would occur within the formed pellets, the pellets would be broken owing to the slaking operation.

The finished pellets are finally brought to a silo 13 and thence to a place of use.

It should be apparent that the invention can be varied within the spirit and scope defined by the following claims.

I claim:

1. A process for the production of cold bound pellets of ore concentrates, comprising the steps of:
   (a) combining moist concentrate fractions of different particle size distributions, of which two-thirds of the total concentrate quantity consists of a relatively coarse fraction having particle sizes of up to about 80% finer than 0.4 mm. and one-third is ground to a finer fraction having the normal grain sizes of at least 80% finer than 0.08 mm.;
   (b) adding to the moist concentrate mixture a binder comprising at least one of the agents of the group consisting of fine ground and slaked slag, slaked lime and portland cement;
   (c) homogenizing the admixture of concentrate mixture and binder by at least an appreciable degree of joint grinding;
   (d) forming pellets of the homogenized mixture;
   (e) controlling the moisture content of the green pellets to not more than about 5%; and
   (f) treating the pellets with steam in an autoclave at a temperature of 160°–230° C. and a pressure of up to about 70 atmospheres during a time of up to 24 hours.

2. A process according to claim 1, in which ore concentrate and binder are jointly ground in a mill to a degree corresponding to a gross energy supply to the mill of 1–10 kw.-h./ton of the mixture.

3. A process according to claim 2, in which the homogenizing grinding operation is carried out by means of a rod mill.

4. A process according to claim 1, in which the ground mixture directly after the grinding operation and without storing or any other delaying treatment is subjected to pelletizing by rolling.

5. A process according to claim 1, in which the binder comprises steel furnace slag which has been slaked before added to the ore concentrate.

6. A process according to claim 5, in which the steel furnace slag is fine ground before it is slaked.

7. A process according to claim 1, in which prior to the autoclaving the pellets contain 2–20% by weight of slaked steel furnace slag; up to 10% by weight of lime; and up to 10% by weight of portland cement.

References Cited

UNITED STATES PATENTS

| | | | |
|---|---|---|---|
| 3,505,439 | 4/1970 | Moorehead et al. | 264—82 |
| 3,338,705 | 8/1967 | Meyer et al. | 75—3 |
| 859,411 | 7/1907 | Schumacher | 75—3 |
| 899,581 | 9/1908 | Weiss | 75—3 |
| 2,394,793 | 2/1946 | Maier | 75—3 |
| 2,855,290 | 10/1958 | Freeman | 75—3 X |
| 2,914,395 | 11/1959 | Davies | 75—3 X |
| 3,235,371 | 2/1966 | Volin et al. | 75—3 |
| 3,333,951 | 8/1967 | Ban | 75—3 |
| 3,420,453 | 1/1969 | Tada et al. | 75—3 X |
| 3,490,895 | 1/1970 | Svensson | 75—3 |

FOREIGN PATENTS

| | | | |
|---|---|---|---|
| 623,316 | 5/1949 | Great Britain | 264—333 |
| 1,092,551 | 11/1967 | Great Britain | 75—3 |

ALLEN B. CURTIS, Primary Examiner